(12) United States Patent
Rollins

(10) Patent No.: US 11,080,450 B1
(45) Date of Patent: Aug. 3, 2021

(54) CALCULATING INDUCTANCE BASED ON A NETLIST

(71) Applicant: Synopsys, Inc., Mountain View, CA (US)

(72) Inventor: Joseph Gregory Rollins, Henderson, NV (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/071,848

(22) Filed: Oct. 15, 2020

Related U.S. Application Data

(60) Provisional application No. 62/928,766, filed on Oct. 31, 2019.

(51) Int. Cl.
| | |
|---|---|
| *G06F 30/36* | (2020.01) |
| *G06F 30/33* | (2020.01) |
| *G06F 30/373* | (2020.01) |
| *G06F 30/398* | (2020.01) |
| *G06F 119/06* | (2020.01) |

(52) U.S. Cl.
CPC .............. *G06F 30/36* (2020.01); *G06F 30/33* (2020.01); *G06F 30/398* (2020.01); *G06F 30/373* (2020.01); *G06F 2119/06* (2020.01)

(58) Field of Classification Search
CPC ........ G06F 30/36; G06F 30/33; G06F 30/373; G06F 30/398; G06F 2119/06
USPC .................... 716/103, 111, 132, 136; 703/14
See application file for complete search history.

(56) References Cited

U.S. PATENT DOCUMENTS

| | | | | | |
|---|---|---|---|---|---|
| 6,057,171 | A | * | 5/2000 | Chou | ...................... H01L 22/34 438/14 |
| 6,502,230 | B1 | * | 12/2002 | Graef | .................... G06F 30/367 716/113 |
| 8,239,811 | B2 | * | 8/2012 | Anemikos | ............... H01L 22/12 716/134 |

(Continued)

OTHER PUBLICATIONS

Escovar, "Tools for Impedance Extraction in Integrated Circuits (IC)", Universite Joseph-Fourier, Grenoble I, 2006, 238 pages. (Year: 2006).*

(Continued)

*Primary Examiner* — Phallaka Kik
(74) *Attorney, Agent, or Firm* — Park, Vaughan, Fleming & Dowler LLP; Laxman Sahasrabuddhe

(57) ABSTRACT

A netlist may include a set of resistance components of an integrated circuit (IC) design, and may specify a length, a width, and a metal layer of each resistance component in the set of resistance components, and physical locations of circuit nodes connected to each resistance component in the set of resistance components. A process description may specify the resistivity and thickness of each metal layer in the IC design. For a resistance component in the set of resistance components, resistivity and thickness of the metal layer of the resistance component may be determined based on the process description, and an inductance component corresponding to the resistance component may be determined based on the length and the width of the resistance component, the resistivity and the thickness of the metal layer of the resistance component, and the physical locations of the circuit nodes connected to the resistance component.

20 Claims, 6 Drawing Sheets

---

Receive a netlist that includes a set of resistance components of an IC design, where the netlist specifies a length, a width, and a metal layer of each resistance component in the set of resistance components, and where the netlist specifies physical locations of circuit nodes connected to each resistance component in the set of resistance components ⟶ 802

Receive a process description that specifies resistivity and thickness of each metal layer in the IC design ⟶ 804

For a resistance component in the set of resistance components, determine resistivity and thickness of the metal layer of the resistance component based on the process description, and determine an inductance component corresponding to the resistance component based on the length and the width of the resistance component, the resistivity and the thickness of the metal layer of the resistance component, and the physical locations of the circuit nodes connected to the resistance component ⟶ 806

(56) References Cited

U.S. PATENT DOCUMENTS

| | | | | |
|---|---|---|---|---|
| 2003/0131334 A1* | 7/2003 | Suaya | ............... | G06F 30/367 |
| | | | | 716/113 |
| 2006/0022678 A1* | 2/2006 | Hegazy | ............. | G01R 31/2853 |
| | | | | 324/525 |
| 2010/0332208 A1* | 12/2010 | Victory | ................ | G06F 30/367 |
| | | | | 703/14 |
| 2016/0210393 A1* | 7/2016 | Chavhan | ............... | G06F 30/394 |

OTHER PUBLICATIONS

A.E. Ruehli, "Inductance Calculations in a Complex Integrated Circuit Environment," IBM J. Res. Develop, pp. 470-481, Sep. 1972.

M. Kamon et al., "FASTHENRY: A Multipole-Accelerated 3D Inductance Extraction Program," IEEE Trans Microwave Theory and Techniques, vol. 42, No. 9, pp. 1750-1760, Sep. 1994.

* cited by examiner

Netlist 300

Line 301 → *|S (n1 1.00   4.000)  $lvl=21
Line 302 → *|S (n2  21.00  4.00)  $lvl=21
Line 303 → *|S (n3 5.00  2.00)  $lvl=21
Line 304 → *|S (n4 26.00   2.00)  $lvl=21
Line 305 → R1 n1 n2  0.30 $l=20.0 $w=1.10 $lvl=21 $si_w=1.00
Line 306 → R2 n3 n4 0.35 $l=21.0 $w=1.10 $lvl=21 $si_w=1.00

FIG. 5
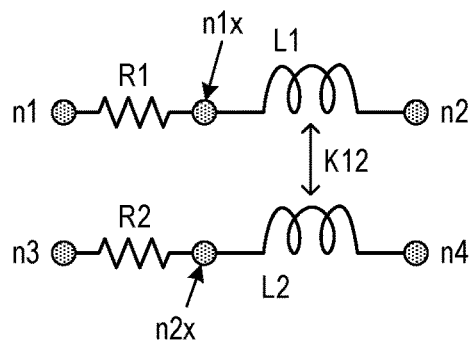
FIG. 6
Netlist 700
Line 701 → *|S (n1 1.00  4.000)  $lvl=21
Line 702 → *|S (n2 21.00  4.00)  $lvl=21
Line 703 → *|S (n3 5.00  2.00)  $lvl=21
Line 704 → *|S (n4 26.00  2.00)  $lvl=21
Line 705 → R1 n1 n1x  0.30 $l=20.0 $w=1.10 $lvl=21 $si_w=1.00
Line 706 → L1 n1x  n2   33e-12
Line 707 → R2 n3 n2x  0.35 $l=21.0 $w=1.10 $lvl=21 $si_w=1.00
Line 708 → L2 n2x  n4  35e-12
Line 709 → K12   L1  L2  0.23
FIG. 7

CALCULATING INDUCTANCE BASED ON A NETLIST

RELATED APPLICATION

This application claims the benefit of U.S. Provisional Application Ser. No. 62/928,766, filed on 31 Oct. 2019, the contents of which are herein incorporated by reference in their entirety for all purposes.

TECHNICAL FIELD

The present disclosure generally relates to integrated circuit (IC) design. More specifically, the present disclosure relates to calculating inductance based on a netlist.

BACKGROUND

Advances in process technology and an increasing demand for computing and storage have fueled an increase in the size and complexity of IC designs. These advances can be attributed to improvements in semiconductor design and manufacturing technologies which have made it possible to integrate tens of millions of devices onto a single chip. Efficiently calculating electrical characteristics of an IC design is important.

SUMMARY

Some embodiments described herein may receive a netlist that includes a set of resistance components of an IC design, where the netlist specifies a length, a width, and a metal layer of each resistance component in the set of resistance components, and where the netlist specifies physical locations of circuit nodes connected to each resistance component in the set of resistance components. The embodiments may also receive a process description that specifies resistivity and thickness of each metal layer in the IC design. Next, for a resistance component in the set of resistance components, the embodiments may determine resistivity and thickness of the metal layer of the resistance component based on the process description, and determine an inductance component corresponding to the resistance component based on the length and the width of the resistance component, the resistivity and the thickness of the metal layer of the resistance component, and the physical locations of the circuit nodes connected to the resistance component. A netlist may then be generated that includes the resistance component and the inductance component coupled in series.

In some embodiments, a resistance component from the set of resistance components may be selected based on criteria that include, but are not limited to: (1) a criterion to select resistance components having a length that is greater than a threshold length, (2) a criterion to select resistance components associated with a net identifier, (3) a criterion to select resistance components on a particular metal layer, and/or (4) a criterion to select resistance components within a bounding box.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

FIG. 5 illustrates a circuit schematic corresponding to the netlist of FIG. 3 in accordance with some embodiments disclosed herein.

FIG. 6 illustrates a circuit schematic that includes resistances and calculated inductances in accordance with some embodiments disclosed herein.

FIG. 7 illustrates a netlist corresponding to the circuit schematic of FIG. 6 in accordance with some embodiments described herein.

DETAILED DESCRIPTION

Figure 1:
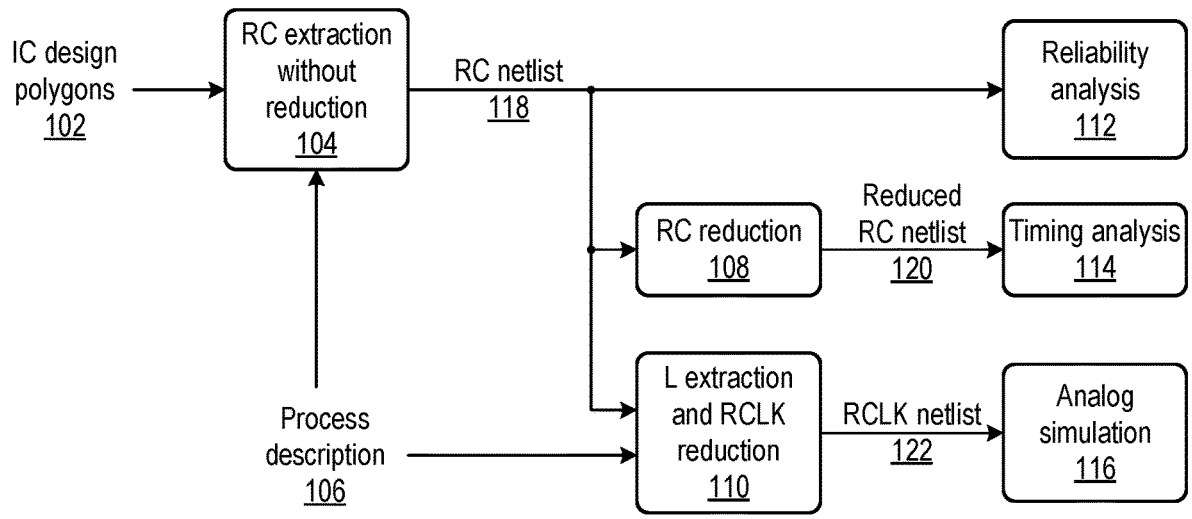
FIG. 1 illustrates a flow during physical verification of an IC design in accordance with some embodiments disclosed herein.

A netlist is a representation of an IC design that includes connected components such as resistors, capacitors, inductors, transistors, power sources, etc. IC design simulation is a process in which a netlist is analyzed to determine how the IC design will operate. Extraction is a process in which the geometrical shapes specified in an IC design layout are used to calculate numerical values of electrical components (e.g., parasitic resistances, capacitances, inductances, etc.) of a netlist that corresponds to the IC design.

Some software tools extract resistance (R) and capacitance (C) values from an IC design layout, and the resulting netlist may be used for performing IC design simulation. Extracting the inductance (L) and mutual inductance (K) from the IC design layout is becoming increasingly important in the industry, and some software tools extract R, C, L, and K values from an IC design layout. In these tools, the extraction related calculations for the R, C, L, and K values are performed at the same time.

In this disclosure, the term "RC netlist" refers to a netlist that includes resistance and capacitance components, but does not include inductance or mutual inductance components, and the term "RCLK" netlist refers to a netlist that includes resistance (R), capacitance (C), inductance (L), and mutual inductance (K) components. Specifically, in the Simulation Program with Integrated Circuit Emphasis (SPICE) format, the mutual inductances are depicted as "K" elements, and the resulting netlist is referred to as a RCLK netlist.

Different applications may use netlists that include or do not include inductances. Specifically, some reliability analysis tools and timing analysis tools do not use inductance values, and may accept an RC netlist as input. On the other hand, an RCLK netlist may be used for timing analysis tools and analog simulation applications that use inductance values in their calculations. Moreover, users may want to compare results with and without including inductance (L) in the netlist to understand and verify the effect that inductance has on the IC design. Therefore, it may be advantageous to separately maintain the RC portion of the netlist, and add the inductance components in a separate step when desired. In current tools, users typically execute the extraction process twice: first the process is executed to extract R and C, and then the process is again executed to extract R, C, L, and K.

Embodiments disclosed herein enable efficient extraction of L and K as a separate and independent step after the extraction of R and C has been performed on the IC design, thereby providing greater flexibility. In other words, embodiments disclosed herein can separate the inductance extraction step from the RC extraction step.

Advantages of embodiments disclosed herein include, but are not limited to: (1) extracting and storing an RC netlist (which can be done using existing extraction tools that do not extract inductances), and using the RC netlist to calculate the inductances when desired, (2) avoid repeating the RC extraction when an RCLK netlist is desired (note that, in many cases, extracting the RC values is the most computationally expensive part of RCLK extraction), (3) calculating inductances by circuit or timing simulation tools as desired without separately creating and storing an RCLK netlist, (4) adding inductors to netlists produced by older extraction tools which do not calculate inductance, (5) maintaining a clear separation between the RC portion of the netlist and the LK portion of the netlist to help isolate and understand the effects of inductance in the IC design, and (6) allowing parameters that control how the inductance is calculated to be changed without needing to re-extracting the RC portion of the netlist. Furthermore, since the repeated extraction of RC is avoided when the RCLK netlist is desired, fewer computing or processing resources are utilized to generate the RCLK netlist.

During physical verification, users may perform many types of analyses on the IC design to determine if the IC design is expected to operate as desired after fabrication. Specifically, reliability analysis, timing analysis, and analog simulation may be performed during physical verification. In reliability analysis, each segment of metal (e.g., a rectangular piece of metal in the IC design) may be analyzed to determine if the current flowing within the segment is within safe limits. Therefore, the netlist that is used for reliability analysis may include a large number of resistors, where each resistor corresponds to a metal segment. Note that the reliability netlist corresponds most closely to the original polygons in the IC design layout.

In timing analysis, the point-to-point resistance of the metal conductors between the transistors is of the primary concern, and not the individual segments of metal. Therefore, an operation called reduction can be performed to reduce the size of the netlist. Reduction removes circuit nodes and branches in a way that preserves electrical delays and impedances of the circuit. As a result, the reduced netlist that is used for timing analysis may have a small fraction of the resistors that are present in the netlist that is used for reliability analysis.

In analog simulation, the inductances of the segments may need to be calculated to accurately simulate the voltage and current value of analog signals in the IC design.

In summary, the extraction accuracy requirements may be different for these tools. In some existing approaches, extraction is performed multiple times (e.g., once for each type of analysis), and multiple different netlists are generated. Embodiments disclosed herein avoid performing netlist extraction multiple times.

FIG. 1 illustrates a flow during physical verification of an IC design in accordance with some embodiments disclosed herein.

IC design polygons 102 (which are specified in an IC design layout) and process description 106 can be provided as input to RC extraction without reduction 104 block. RC extraction without reduction 104 converts IC design polygons into RC netlist 118. RC netlist 118 may be used as is in reliability analysis 112. Alternatively, RC netlist 118 may be reduced during RC reduction 108, and the resulting reduced RC netlist 120 may be used for timing analysis 114. Specifically, RC reduction 108 can simplify RC netlist 118 to produce an equivalent RC netlist that has fewer components. For example, during RC reduction 108, a set of resistances coupled in series (which may represent resistances of a set of electrically connected metal segments) can be replaced by a single resistance (which may represent the resistance of the entire connection) whose value is equal to the sum of the set of resistances.

In some embodiments described herein, RC netlist 118 and process description 106 can be provided as input to L extraction and RCLK reduction 110 block. During L extraction and RCLK reduction 110, inductance values can be computed based on RC netlist 118, and the resulting RCLK netlist 122 (i.e., the output of L extraction and RCLK reduction 110 block) can be used for analog simulation 116.

In FIG. 1, RC extraction is only performed once in the RC extraction without reduction 104 block. RC extraction (in particular, the geometry processing performed during RC extraction) is computationally intensive. RC reduction 108 operates on RC netlist 118 (and not IC design polygons 102), and can be performed efficiently and quickly. Tools exist to perform RC extraction without reduction 104. Embodiments disclosed herein can calculate inductances based on the RC netlist generated by existing RC extraction tools. In some embodiments, the unreduced RC netlist (i.e., RC netlist 118) that is used by reliability analysis tools contains additional information about the shapes and sizes of the metal segments. This information may be stored as annotations associated with the circuit nodes and/or resistors. Reliability analysis tools may use this additional information to analyze the current density in the metal segments.

As explained in reference to FIG. 1, RC netlist 118 (which is an unreduced netlist) and process description 106 can be provided as input to L extraction and RCLK reduction 110 block, which can output RCLK netlist 122 (which is a reduced netlist). RC netlist 118 may include annotations for circuit node locations and resistor sizes. Specifically, each circuit node location may be specified using three dimensional (3D) coordinates, e.g., an X-coordinate, a Y-coordinate, and a metal layer (which provides the Z-coordinate). Each resistor size may be specified by a length, a width, and a metal layer (which indicates the metal layer on which the segment exists). Process description 106 may provide the thickness and resistivity values of the metal layers based on the semiconductor manufacturing process that is used for fabricating the IC design layout. RCLK netlist 122 may be a netlist that includes resistances, capacitances, inductances, and mutual inductances.

Embodiments disclosed herein leverage the following insight: the unreduced RC netlist 118 (which is typically used for reliability analysis) contains information needed to specify the locations and physical sizes of the metal segments which make up the conductors of the circuit, and this information can be reused to calculate the inductance. Specifically, instead of performing a full RCLK extraction based on the IC design polygons (as is done by existing approaches), embodiments disclosed herein can skip RC extraction, and use an existing unreduced RC netlist to determine the sizes and location of the metal segments. Next, each metal segment specified in the unreduced RC netlist can be used to calculate the self-inductance of the metal segment (and mutual inductances with other metal segments). The calculated inductance can be coupled in series with the resistance that corresponds to the metal segment.

Figure 2:
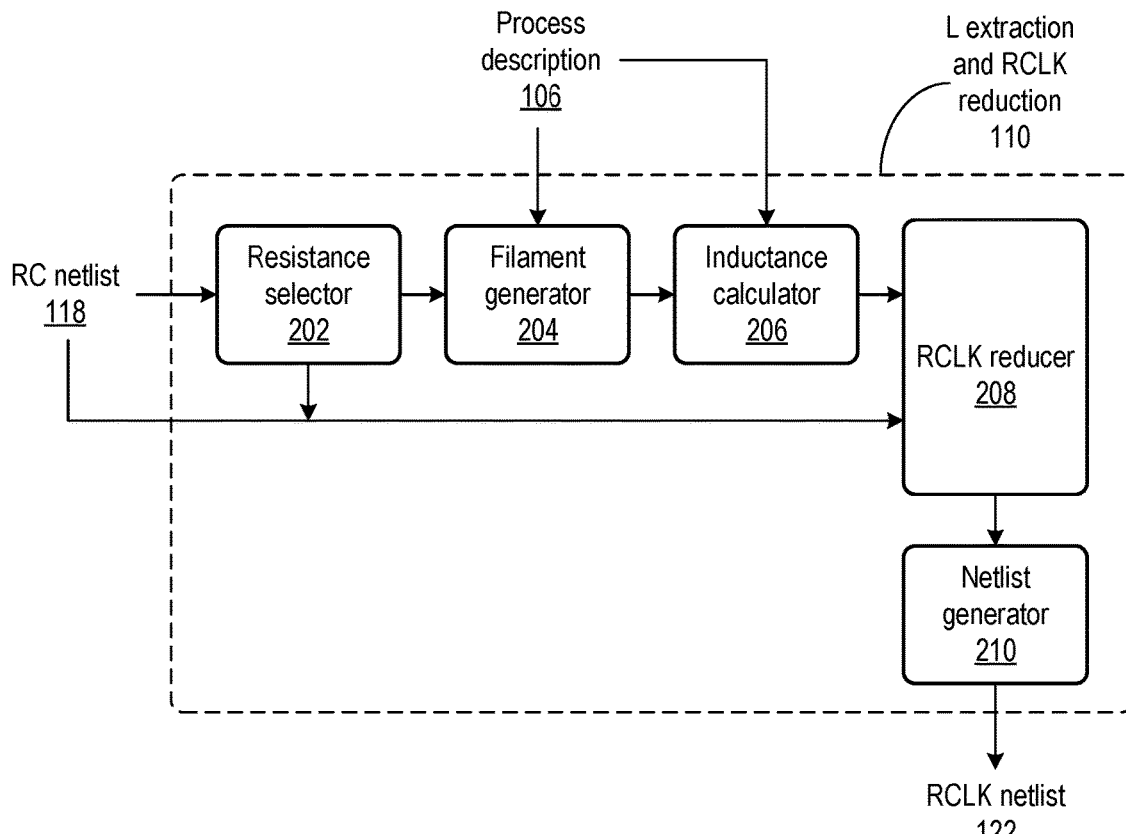
FIG. 2 illustrates a flow for calculating the inductance based on a netlist in accordance with some embodiments disclosed herein.

FIG. 2 illustrates a flow for calculating the inductance based on a netlist in accordance with some embodiments disclosed herein. L extraction and RCLK reduction 110 block may include resistance selector 202, filament generator 204, inductance calculator 206, RCLK reducer 208, and netlist generator 210.

In resistance selector 202, certain resistances may be selected for inductance extraction. Resistance selection criteria may include, but are not limited to: minimum length threshold (which enables selection of resistors that have a length that is greater than the minimum length threshold because, e.g., segments smaller than the minimum length threshold may have negligible inductance), one or more net identifiers (which enables selection of resistors that are associated with a particular set of nets), one or more metal layer identifiers (which enables selection of resistors that are associated with a particular set of metal layers), and one or more bounding boxes (which enables selection of resistors that are located within a particular set of bounding boxes). The output of resistance selector 202 may include a set of resistors that satisfied the set of criteria that was used to select resistors in RC netlist 118. Other information in RC netlist 118, e.g., circuit nodes, capacitors, and non-selected resistors, are passed on to RCLK reducer 208.

In filament generator 204, the metal segments corresponding to the resistances selected by resistance selector 202 can be further subdivided into a plurality of current filaments, as is deemed necessary to improve the accuracy of the inductance calculation. Specifically, filament generator 204 can divide each metal segment into multiple parallel filaments, and the current within each filament can be assumed to be a constant. Each filament may have the same length as the metal segment, but may have a smaller width.

In inductance calculator 206, the inductance of each segment may be calculated. Specifically, the inductance calculation can be represented as:

$$L = f(l, w, t, rho, \text{freq}),$$

where, L is the inductance of the filament or segment, l is the length of the filament or segment, w is the width of the filament or segment, t is the thickness of the filament or segment, rho is the resistivity of the filament or segment material, and freq is the frequency of the signal (note that, due to a phenomenon known as the skin effect, the inductance of a conductor can depend on the frequency of the signal that passes through the conductor). Specifically, in some embodiments, process models (which model the semiconductor manufacturing process) may be applied to conductor dimensions to determine the actual printed dimension of the conductor before providing the shape information of the conductor (i.e., l, w, and t values) to the inductance calculation.

The resistance of the filament or segment can be represented as a function of shape and resistivity. Specifically, the resistance can be expressed as:

$$R = f(l, w, t, rho, \text{freq}),$$

where, R is the resistance of the filament or segment, l is the length of the filament or segment, w is the width of the filament or segment, t is the thickness of the filament or segment, rho is the resistivity of the filament or segment material, and freq is the frequency of the signal. As shown above, the resistance calculation may use the frequency value to adjust the resistance value due to the skin effect. If the conductors are subdivided into many filaments, then the skin effect may be implicitly accounted for in the model.

In some embodiments, resistance can be calculated as follows:

$$R = f(l, w, t, rho, \text{freq}) = (l \times rho)/(w \times t).$$

Other embodiments may use a different expression to calculate the resistance if the semiconductor processing technology causes the resistance to be non-linear. The calculated resistance and inductance of a segment are coupled in series. Thus, the inductance of a segment may be conveniently stored with the resistance value during computation.

Mutual inductance between pairs of filaments is a function of the sizes of the two filaments and their separation, and adds a coupling term between two inductances in the netlist. The mutual inductance can be expressed as follows:

$$K = f(l_1, w_1, t_1, rho_1, l_2, w_2, t_2, rho_2, d),$$

where, K is the mutual inductance, $l_1$ is the length of the first filament or segment, $w_1$ is the width of the first filament or segment, $t_1$ is the thickness of the first filament or segment, $rho_1$ is the resistivity of the first filament or segment material, $l_2$ is the length of the second filament or segment, $w_2$ is the width of the second filament or segment, $t_2$ is the thickness of the second filament or segment, and $rho_2$ is the resistivity of the second filament or segment material.

The RCLK netlist outputted by inductance calculator 206 may include many small metal segments because inductance calculator 206 uses the unreduced RC netlist 118 for its calculations. In other words, RCLK netlist outputted by inductance calculator 206 may have many R, C, L, and K elements. For most non-reliability applications, many circuit nodes and branches in the unreduced RCLK netlist can be removed without adversely impacting the accuracy of the application. Thus, RCLK reducer 208 may generate a reduced RCLK circuit that has significantly fewer circuit nodes and elements. Finally, netlist generator 210 may generate RCLK netlist 122 based on the reduced RCLK circuit. Netlist generator 210 may format RCLK netlist 122 in a desired format and write it to disk so that other applications (e.g., analog simulation) may perform further processing using RCLK netlist 122.

Embodiments described herein can generally use any existing technique for calculating the inductance and mutual inductance of filaments and segments. Specifically, in some embodiments, the Partial Element Equivalent Circuit (PEEC) method may be used.

Figures 3, 4:
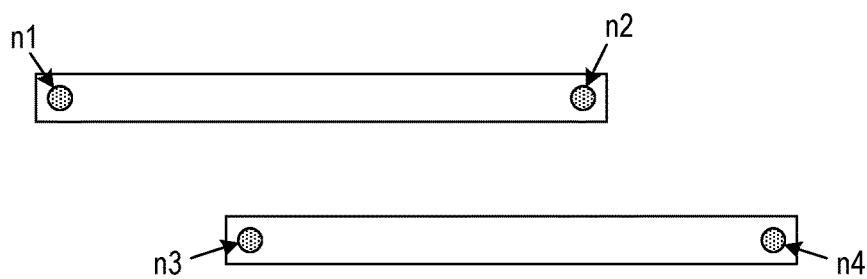
FIG. 3 illustrates a netlist in accordance with some embodiments described herein.
FIG. 4 illustrates metal segments corresponding to a netlist in accordance with some embodiments disclosed herein.

FIG. 3 illustrates a netlist in accordance with some embodiments described herein. An RC netlist (such as the one shown in FIG. 3) may generally be specified in any format. For example, netlist 300 is specified in Detailed Standard Parasitic Format (DPSF).

Lines 301, 302, 303, and 304 in netlist 300 specify locations of circuit nodes n1, n2, n3, and n4, respectively. Specifically, the phrase "*|S" indicates that the line contains information about a circuit node, the phrase "(n1 1.00 4.000)" in line 301 specifies that the X- and Y-coordinates of circuit node n1 are 1.00 and 4.000, respectively, and the phrase "$lvl=21" specifies the metal layer, which corresponds to the Z-coordinate (the notation "$lvl=21" specifies that circuit node n1 is located in metal layer 21). The actual Z-coordinate can be determined by cross-referencing a given metal layer (e.g., metal layer 21) with the information contained in process description 106. In particular, process description 106 may specify the distance between different metal layers, and this information may be used to determine the Z-coordinate of a conductor on a given metal layer. Likewise, lines 302, 303, and 304 specify information for circuit nodes n2, n3, and n4.

Lines 305 and 306 provide details of two metal segments that have resistances R1 and R2 in netlist 300. Specifically, the phrase "R1 n1 n2 0.30" in line 305 specifies that resistance R1 is between circuit nodes n1 and n2, and has a resistance of 0.30 ohm. The phrase "$l 20.0 $w=1.10 $1v1=21 $si_w=1.00" in line 305 specifies that the length of the metal segment is 20.0 microns, the width of the metal segment is 1.10 microns, the metal segment is located in metal layer 21, and the silicon width of the metal segment is 1.00 microns (the "silicon width" of a metal segment is the actual width of the metal segment when the metal segment is printed on the wafer; note that the width of the segment is expected to shrink from 1.10 microns to 1.00 microns in this particular example).

The parameters for resistance R2 are likewise specified in line 306. Note that the silicon width of a segment (which may be specified in the netlist using keyword "$si_w") may be determined by using information in process description 106 to calculate the actual width that the conductor or metal segment is expected to have when the conductor is printed on the wafer.

In some embodiments, the length of a metal segment may not be directly specified in the netlist. In these embodiments, the length may be computed by determining the distance between the two circuit nodes of the metal segment or resistor. For example, if line 305 did not directly specify the length ("$l 20.0"), then the length could have been calculated by determining the distance between circuit nodes n1 and n2 based on the coordinates of the circuit nodes. The resistivity (rho) and thickness (t) values can be obtained from process description 106. Specifically, process description 106 may contain tables that specify the resistivity and thickness of each metal layer. Thus, the metal layer number or identifier (e.g., "$1v1=21" in line 305) may be used to lookup the resistivity and thickness of segments that are located on the metal layer.

FIG. 4 illustrates metal segments corresponding to a netlist in accordance with some embodiments disclosed herein. The segments illustrated in FIG. 4 correspond to netlist 300 shown in FIG. 3. Specifically, one segment exists between circuit nodes n1 and n2, and another segment exists between circuit nodes n3 and n4. The locations, lengths, and widths of the segments shown in FIG. 4 correspond to the information contained in netlist 300.

FIG. 5 illustrates a circuit schematic corresponding to the netlist of FIG. 3 in accordance with some embodiments disclosed herein. As shown in FIG. 5, resistance R1 exists between circuit nodes n1 and n2, and resistance R2 exists between circuit nodes n3 and n4. The circuit schematic illustrated in FIG. 5 may also include capacitances (not shown in FIG. 5).

FIG. 6 illustrates a circuit schematic that includes resistances and calculated inductances in accordance with some embodiments disclosed herein. L extraction and RCLK reduction 110 can calculate inductances based on netlist 300, and the resulting RCLK netlist is represented as a circuit schematic in FIG. 6. Specifically, inductance L1 has been added in series to resistance R1, inductance L2 has been added in series to resistance R2, and mutual inductance K12 is shown between inductance L1 and L2. The values of L1, L2, and K12 may be calculated based on the lengths, widths, and metal layers of resistances that were specified in netlist 300. Note that two new circuit nodes—n1x and n2x—have been added to accommodate the two inductances in the circuit schematic.

FIG. 7 illustrates a netlist corresponding to the circuit schematic of FIG. 6 in accordance with some embodiments described herein. Specifically, L extraction and RCLK reduction 110 can calculate inductances based on netlist 300 and process description 106, and generate RCLK netlist 700.

Lines 701, 702, 703, and 704 in netlist 700 specify locations of circuit nodes n1, n2, n3, and n4, respectively. Note that lines 701-704 correspond to lines 301-304. Lines 705 and 707 provide details of resistances R1 and R2, respectively, and lines 705 and 707 correspond to lines 305 and 306, respectively. Line 705 indicates that resistance R1 exists between circuit nodes n1 and n1x, and line 707 indicates that resistance R2 exists between circuit nodes n3 and n2x.

Lines 706 and 708 correspond to the inductances that were calculated by L extraction and RCLK reduction 110. Specifically, line 706 indicates that inductance L1 exists between circuit nodes n1x and n2, and the value of the inductance is $33 \times 10^{-12}$ henry, and line 708 indicates that inductance L2 exists between circuit nodes n2x and n4, and the value of the inductance is $35 \times 10^{-12}$ henry. Line 709 indicates that K12 is the mutual inductance between inductances L1 and L2, and the value of the mutual inductance is 0.23 (mutual inductance is a dimensionless quantity).

Figure 8:
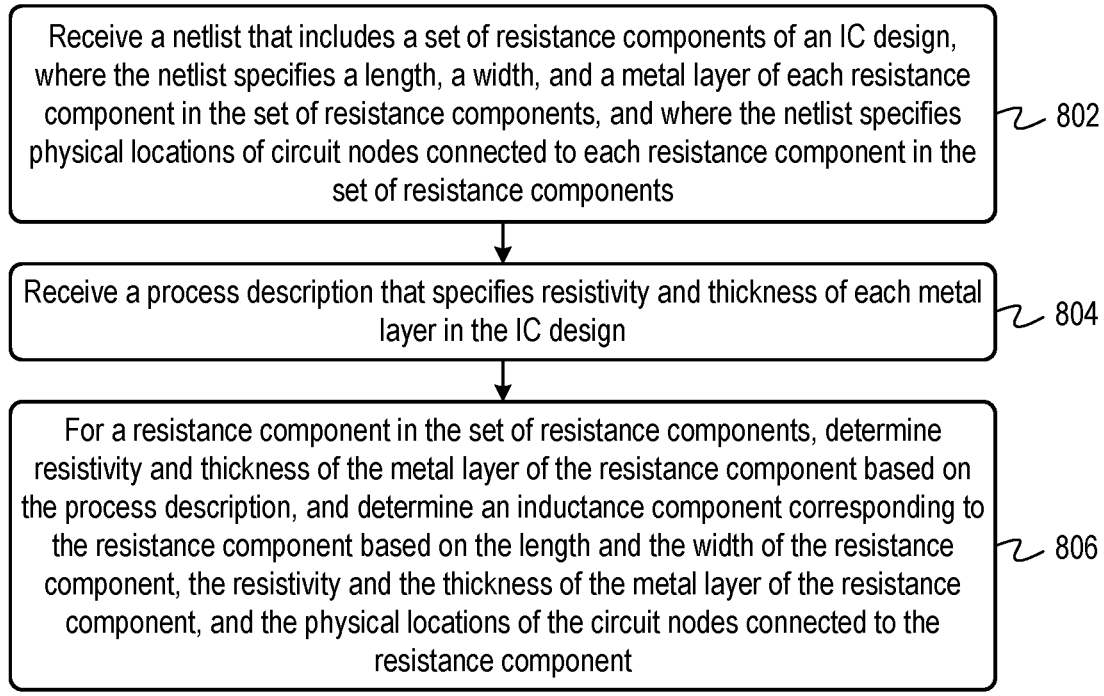
FIG. 8 illustrates a process for calculating inductance based on a netlist in accordance with some embodiments disclosed herein.

FIG. 8 illustrates a process for calculating inductance based on a netlist in accordance with some embodiments disclosed herein. The process may begin by receiving a netlist (e.g., netlist 300) that includes a set of resistance components of an IC design, where the netlist specifies a length, a width, and a metal layer of each resistance component in the set of resistance components, and where the netlist specifies physical locations of circuit nodes connected to each resistance component in the set of resistance components (operation 802). The process may then receive a process description that specifies resistivity and thickness of each metal layer in the IC design (operation 804).

In some embodiments, a resistance from the set of resistances may be selected (e.g., by resistance selector 202) based on criteria that include, but are not limited to: (1) a criterion to select resistance components having a length that is greater than a threshold length, (2) a criterion to select resistance components associated with a net identifier, (3) a criterion to select resistance components on a particular metal layer, and/or (4) a criterion to select resistance components within a bounding box.

Next, for a resistance component in the set of resistance components, the process may determine resistivity and thickness of the metal layer of the resistance component based on the process description, and determine an inductance component (e.g., by using inductance calculator 206) corresponding to the resistance component based on the length and the width of the resistance component, the resistivity and the thickness of the metal layer of the resistance component, and the physical locations of the circuit nodes connected to the resistance component (operation 806). A netlist (e.g., netlist 700) may then be generated that includes the resistance and the inductance coupled in series.

Figure 9:
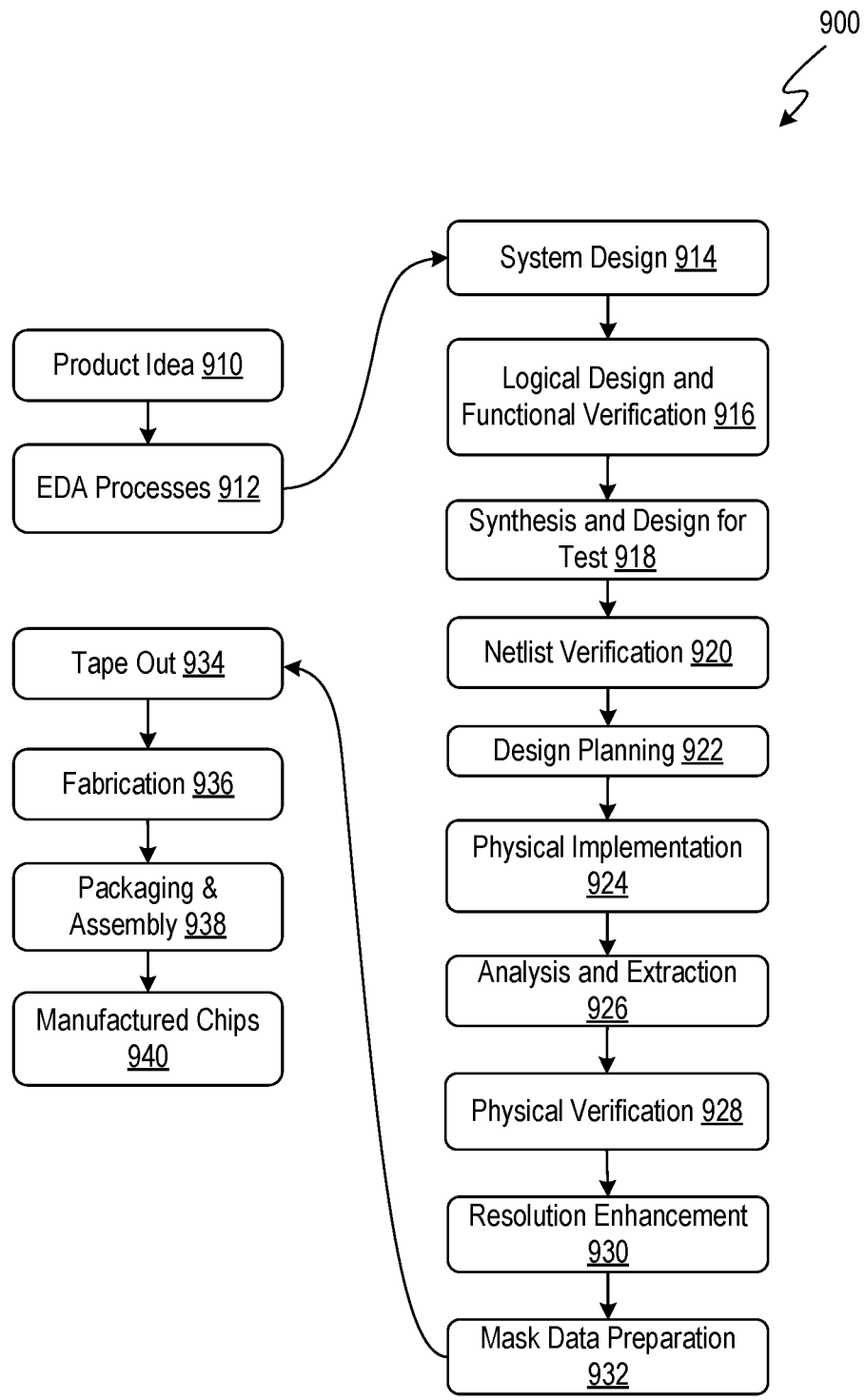
FIG. 9 illustrates an example flow for the design, verification, and fabrication of an integrated circuit in accordance with some embodiments described herein.

FIG. 9 illustrates an example flow 900 for the design, verification, and fabrication of an integrated circuit in accordance with some embodiments described herein.

EDA processes 912 (the acronym "EDA" refers to "Electronic Design Automation") can be used to transform and verify design data and instructions that represent the integrated circuit. Each of these processes can be structured and enabled as multiple modules or operations.

Flow 900 can start with the creation of a product idea 910 with information supplied by a designer, information which is transformed and verified by using EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly 938 are performed to produce the manufactured IC chip 940.

Specifications for a circuit or electronic structure may range from low-level transistor material layouts to high-level description languages. A high-level of abstraction may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower abstraction level that is a less abstract description adds more detail into the design description. The lower levels of abstraction that are less abstract descriptions can be generated by a computer, derived from a design library, or created by another design automation process. An example of a specification language at a lower level of abstraction language for specifying more detailed descriptions is SPICE (which stands for "Simulation Program with Integrated Circuit Emphasis"). Descriptions at each level of abstraction contain details that are sufficient for use by the corresponding tools of that layer (e.g., a formal verification tool).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as test-bench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 in FIG. 10) may be used to store the programs and data structures that are used by some or all of the EDA products described herein, and products used for development of cells for the library and for physical and logical design that use the library.

Figure 10:
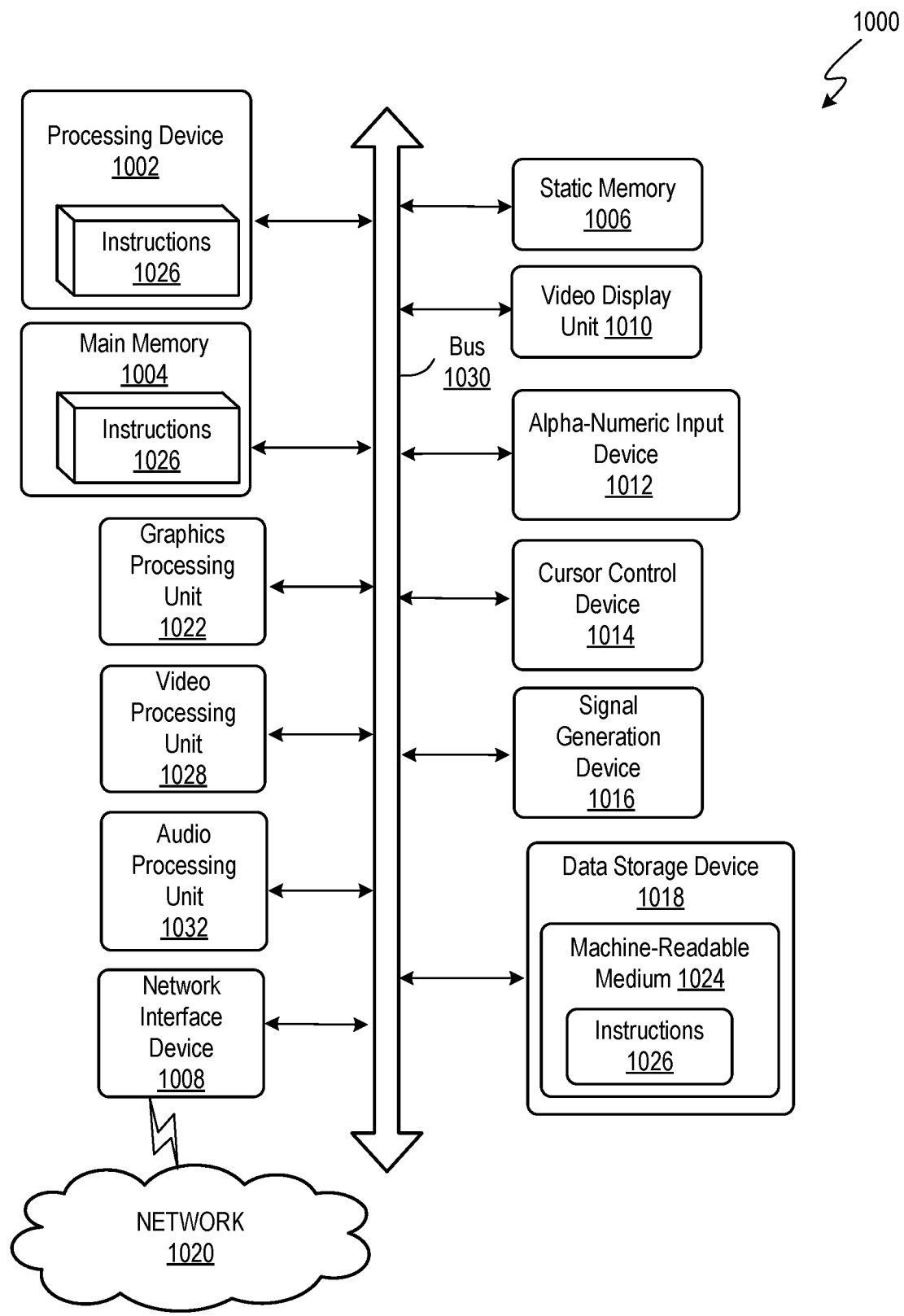
FIG. 10 illustrates an example machine of a computer system within which a set of instructions, for causing the machine to perform any one or more of the methodologies discussed herein, may be executed.

FIG. 10 illustrates an example machine of a computer system 1000 within which a set of instructions, for causing the machine to perform any one or more of the methodologies discussed herein, may be executed.

In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
receiving a first netlist comprising a set of resistance components of an integrated circuit (IC) design, wherein the first netlist specifies a length, a width, and a metal layer of each resistance component in the set of resistance components, and wherein the first netlist specifies physical locations of circuit nodes connected to each resistance component in the set of resistance components;
receiving a process description comprising resistivity and thickness of each metal layer in the IC design; and
for a resistance component in the set of resistance components,
determining resistivity and thickness of the metal layer of the resistance component based on the process description, and
determining, by a processor, an inductance component corresponding to the resistance component based on the length and the width of the resistance component, the resistivity and the thickness of the metal layer of the resistance component, and the physical locations of the circuit nodes connected to the resistance component.

2. The method of claim 1, further comprising generating a second netlist comprising the resistance component and the inductance component coupled in series.

3. The method of claim 1, further comprising selecting the resistance component from the set of resistance components based on a set of criteria.

4. The method of claim 3, wherein the set of criteria comprises a criterion to select a resistance component having a length that is greater than a threshold length.

5. The method of claim 3, wherein the set of criteria comprises a criterion to select resistance components associated with a net identifier.

6. The method of claim 3, wherein the set of criteria comprises a criterion to select resistance components on a particular metal layer.

7. The method of claim 3, wherein the set of criteria comprises a criterion to select resistance components within a bounding box.

8. A non-transitory computer readable storage medium storing instructions, which when executed by a processor, cause the processor to:
receive a first netlist comprising a set of resistance components of an integrated circuit (IC) design, wherein the first netlist specifies a length, a width, and a metal layer of each resistance component in the set of resistance components, and wherein the first netlist specifies physical locations of circuit nodes connected to each resistance component in the set of resistance components;
receive a process description comprising resistivity and thickness of each metal layer in the IC design; and
for a resistance component in the set of resistance components,
determine resistivity and thickness of the metal layer of the resistance component based on the process description, and
determining an inductance component corresponding to the resistance component based on the length and the width of the resistance component, the resistivity and the thickness of the metal layer of the resistance component, and the physical locations of the circuit nodes connected to the resistance component.

9. The non-transitory computer readable storage medium of claim 8, wherein the instructions, which when executed by the processor, further cause the processor to generate a second netlist comprising the resistance component and the inductance component coupled in series.

10. The non-transitory computer readable storage medium of claim 8, wherein the instructions, which when executed by the processor, further cause the processor to select the resistance component from the set of resistance components based on a set of criteria.

11. The non-transitory computer readable storage medium of claim 10, wherein the set of criteria comprises a criterion to select a resistance component having a length that is greater than a threshold length.

12. The non-transitory computer readable storage medium of claim 10, wherein the set of criteria comprises a criterion to select resistance components associated with a net identifier.

13. The non-transitory computer readable storage medium of claim 10, wherein the set of criteria comprises a criterion to select resistance components on a particular metal layer.

14. The non-transitory computer readable storage medium of claim 10, wherein the set of criteria comprises a criterion to select resistance components within a bounding box.

15. An apparatus, comprising:
a memory storing instructions; and
a processor, coupled with the memory and to execute the instructions, the instructions when executed causing the processor to:
receive a first netlist comprising a set of resistance components of an integrated circuit (IC) design, wherein the first netlist specifies a length, a width, and a metal layer of each resistance component in the set of resistance components, and wherein the first netlist specifies physical locations of circuit nodes connected to each resistance component in the set of resistance components;
receive a process description comprising resistivity and thickness of each metal layer in the IC design; and
for a resistance component in the set of resistance components,
determine resistivity and thickness of the metal layer of the resistance component based on the process description, and
determining an inductance component corresponding to the resistance component based on the length and the width of the resistance component, the resistivity and the thickness of the metal layer of the resistance component, and the physical locations of the circuit nodes connected to the resistance component.

16. The apparatus of claim 15, wherein the instructions, which when executed by the processor, further cause the processor to generate a second netlist comprising the resistance component and the inductance component coupled in series.

17. The apparatus of claim 15, wherein the instructions, which when executed by the processor, further cause the processor to select the resistance component from the set of resistance components based on a set of criteria.

18. The apparatus of claim 17, wherein the set of criteria comprises a criterion to select a resistance component having a length that is greater than a threshold length.

19. The apparatus of claim 17, wherein the set of criteria comprises a criterion to select resistance components associated with a net identifier.

20. The apparatus of claim 17, wherein the set of criteria comprises a criterion to select resistance components on a particular metal layer.

\* \* \* \* \*